(12) United States Patent
Koster et al.

(10) Patent No.: US 8,761,398 B2
(45) Date of Patent: Jun. 24, 2014

(54) ACCESS TO AUTHORIZED DOMAINS

(75) Inventors: Robert Paul Koster, Eindhoven (NL); Javier Montaner, Eindhoven (NL); Sorin Marcel Iacob, Enschede (NL); Najib Koraichi, Schimmert (NL)

(73) Assignee: Koninkljijke Philips N.V., Eindhoven (NL)

( * ) Notice: Subject to any disclaimer, the term of this patent is extended or adjusted under 35 U.S.C. 154(b) by 571 days.

(21) Appl. No.: 12/298,941

(22) PCT Filed: Apr. 25, 2007

(86) PCT No.: PCT/IB2007/051533
§ 371 (c)(1),
(2), (4) Date: Oct. 29, 2008

(87) PCT Pub. No.: WO2007/125486
PCT Pub. Date: Nov. 8, 2007

(65) Prior Publication Data
US 2009/0132811 A1    May 21, 2009

(30) Foreign Application Priority Data
May 2, 2006  (EP) .................................. 06113373

(51) Int. Cl.
*H04L 9/00* (2006.01)
(52) U.S. Cl.
CPC ............. *H04L 9/00* (2013.01); *H04L 2209/603* (2013.01)
USPC .............................. 380/277; 726/26; 713/156
(58) Field of Classification Search
CPC ....................................................... H04L 9/00
USPC ............................................................. 380/277
See application file for complete search history.

(56) References Cited

U.S. PATENT DOCUMENTS

| 2003/0005309 A1* | 1/2003 | Ripley et al. | 713/185 |
| 2004/0088541 A1* | 5/2004 | Messerges et al. | 713/156 |

(Continued)

FOREIGN PATENT DOCUMENTS

| WO | 03077470 A1 | 9/2003 |
| WO | 03098931 A1 | 11/2003 |

(Continued)

OTHER PUBLICATIONS

Daniel Thull and Roberto Sannino; "Performance Considerations for an Embedded Implementation of OMA DRM 2." In Proceedings of the conference on Design, Automation and Test in Europe-vol. 3 (DATE '05), vol. 3. IEEE Computer Society, Washington, DC, USA, 46-51.*

(Continued)

*Primary Examiner* — Carl Colin
*Assistant Examiner* — Syed Zaidi

(57) ABSTRACT

In a domain comprising a plurality of devices, the devices in the domain sharing a common domain key, a method of enabling a entity that is not a member of the domain to create an object that can be authenticated and/or decrypted using the common domain key, the method comprising providing to the entity that is not a member of the domain a diversified key that is derived using a one-way function from at least the common domain key for creating authentication data related to said object and/or for encrypting said object, the devices in the domain being configured to authenticate and/or decrypt said object using the diversified key.

12 Claims, 3 Drawing Sheets

(56) References Cited

U.S. PATENT DOCUMENTS

| | | | | |
|---|---|---|---|---|
| 2005/0265555 | A1* | 12/2005 | Pippuri | 380/284 |
| 2007/0107062 | A1* | 5/2007 | Abu-Amara | 726/26 |
| 2009/0217036 | A1* | 8/2009 | Irwin et al. | 713/168 |

FOREIGN PATENT DOCUMENTS

| | | | |
|---|---|---|---|
| WO | 2004027588 | A2 | 4/2004 |
| WO | 2004038568 | A2 | 5/2004 |
| WO | 2004077790 | A1 | 9/2004 |
| WO | 2005010879 | A2 | 2/2005 |
| WO | 2005088896 | A1 | 9/2005 |
| WO | 2005093544 | A1 | 10/2005 |
| WO | 2006048804 | A1 | 5/2006 |
| WO | 2006051494 | A1 | 5/2006 |

OTHER PUBLICATIONS

Anderson, R., and Biham, E.; "Tiger: A fast new hash function," Fast Software Encryption-Lecture Notes in Computer Science, Copyright 1996, Springer Berlin / Heidelberg, pp. 89-97.*

"DRM Specification V2.0, Draft Version 2.0" Open Mobile Alliance™. OMA-DRM-DRM-V2_0-20040420-D, Apr. 20, 2004.*

"OMA DRM Architecture", Open Mobile Alliance™. OMA-DRM-ARCH-V2_0, Mar. 15, 2004.*

P. Koster, F. Kamperman, P. Lenoir, and K. Vrielink. "Identity based DRM: Personal entertainment domain." In IFIP Conference on Communications and Multimedia Security, pp. 42-54, 2005.*

Koen Vrielink: "Domain Authority Definition" Open Mobile Alliance, [Online] Feb. 9, 2006, Retrieved from the Internet: URL :http://member.openmobilealliance. org/ftp/public_documents/drm/2005/OMA-DLDRM-2005.

DVB-Digital Video Broadcasting: "Digital Video Broadcasting (DVB); Content Protection & Copy Management" DVB Document, XX, XX, vol. A094, Nov. 2005, 103 pages, XP007901168.

S.A.F.A. Van Deb Heuvel, et al: "Secure Content Management in Authorised Domains", Philips Research, The Netherlands, IBC 2002, Conf. Publication, pp. 467-474 Sep. 12-16, 2002.

* cited by examiner

ACCESS TO AUTHORIZED DOMAINS

BACKGROUND OF THE INVENTION

In recent years, the number of content protection systems available has been growing rapidly. Some of these systems only protect the content against unauthorized copying, while others restrict the user's ability to access or use the content. These systems are often referred to as Digital Rights Management (DRM) systems.

Consumers want to enjoy content without hassle and with as few limitations as possible. They want to network their devices to enable all types of different applications and easily access any type of content. They also want to be able to share/transfer content in their home environment without limitations.

The concept of Authorized Domains (ADs) tries to find a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks.

Of course, other contexts are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an Authorized Domain (AD) is a system that allows access to content by devices in the domain, but not by any others.

Authorized domains need to address issues such as authorized domain identification, device check-in, device check-out, rights check-in, rights check-out, content check-in, content check-out, as well as domain management. For a more extensive introduction to the use of an Authorized Domain, etc., see S. A. F. A. van den Heuvel, W. Jonker, F. L. A. J. Kamperman, P. J. Lenoir, Secure Content Management in Authorised Domains, Philips Research, The Netherlands, IBC 2002 conference publication, pages 467-474, held at 12-16 Sep. 2002.

In certain architectures for Authorized Domains the entities, e.g. devices, in the domain share a symmetric Domain Key that is used, among other things, to create, access and/or authenticate objects such as content or licenses (rights objects) that are available in the domain. One example is version 2 of the Open Mobile Alliance's DRM Architecture: 5 Approved Version 2.0, OMA-AD-DRM-V2-0-20060303-A, 3 Mar. 2006, hereafter called OMA DRM v2 for short. This document is incorporated by reference into the present document. Another example is WO 20051088896.

In such architectures, the Domain Key cannot be made available to non-member entities since that would enable them to access protected objects even though they are not member of the domain. Still, it is desirable that certain non-member entities be enabled to create objects for use by entities in the domain. One could of course issue these non-member entities different keys, but that requires that each device in each domain holds copies of all of these keys.

SUMMARY OF THE INVENTION

An object of the invention is to enable an entity that is not a member of an authorized domain to create objects that are usable by members of the authorized domain, without providing that entity with the domain key.

This object is achieved in a method as claimed in claim 1. By providing to the device or other entity that is not a member of the domain a diversified key that is derived using a one-way function from the common domain key, it becomes possible for this device to create authentication data related to these objects and/or to encrypt these objects using the diversified key. The devices in the domain can create the diversified key when needed by deriving it using the one-way function from the domain key, which is available to them. They can then use the diversified key to authenticate and/or decrypt objects received from the non-member entity.

According to the invention, the non-member entity does not have access to the domain key, yet it is able to create objects that can be authenticated and/or decrypted by devices in the domain. This provides better control on which entities can issue such objects, such as OMA DRM Rights Objects, to the domain.

Preferably the diversified key is derived using the one-way function from the common domain key and from a representation of an identity of the entity that is not a member of the domain. This has the advantage that different entities receive different diversified keys.

In a preferred embodiment the one-way function comprises a keyed cryptographic hash function. As input in this function one may use a representation of an identity of the entity that is not a member of the domain, such as a public key associated with the device. When the authentication or encryption algorithm requires keys to be of a specific length, one may truncate the output of the one-way function to the required number of bits. For example when using the diversified key with the AES encryption algorithm using 128 bit keys, the key generated using the SHA-1 one way hash function should be truncated from 160 to 128 bits.

In a preferred embodiment, the non-member entity is a Rights Issuer configured for issuing digital rights associated with content items. In this embodiment the objects, comprising the digital rights, are encrypted using the diversified keys.

In an embodiment the method further comprises creating a digitally signed validation token comprising a representation of an identity of the entity that is not a member of the domain.

In a further embodiment the method comprises creating a message authentication code for the objects provided by the entity that is not a member of the domain using the common domain key. Devices that receive such an object from another device now also require the presence of a valid message authentication code. This prevents the non-member entity from generating valid objects for a particular domain and making those available through different channels.

The invention further provides a system and device for executing the method.

Other advantageous embodiments are set out in the dependent claims.

BRIEF DESCRIPTION OF THE FIGURES

These and other aspects of the invention will be apparent from and elucidated with reference to the illustrative embodiments shown in the drawings, in which.

DETAILED DESCRIPTION OF CERTAIN EMBODIMENTS

Figure 1:
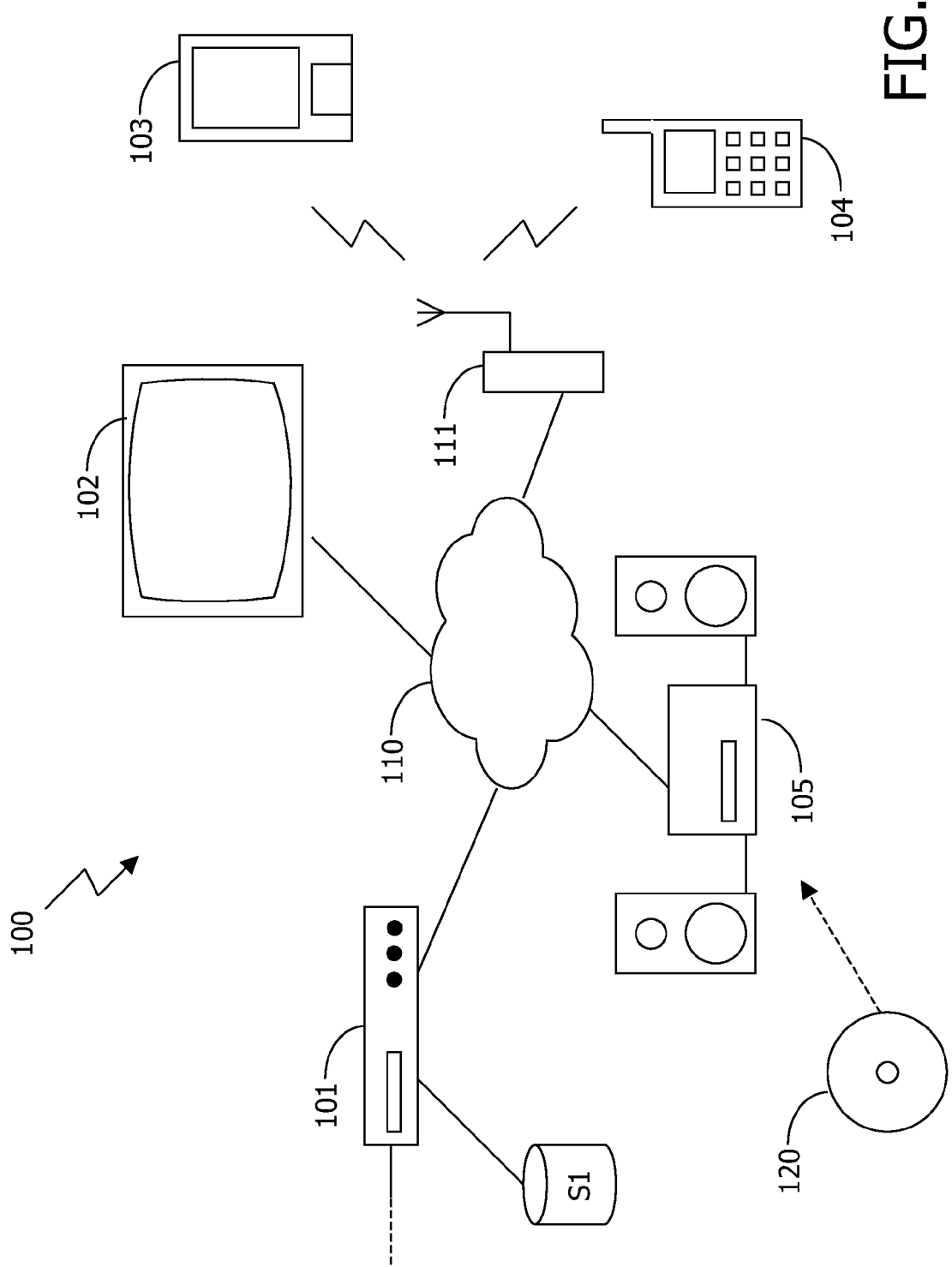
FIG. 1 schematically shows a system comprising devices interconnected via a network.

FIG. 1 schematically shows a system 100 comprising devices 101-105 interconnected via a network 110. A typical digital home network includes a number of devices, e.g. a radio receiver, a tuner/decoder, a CD player, a pair of speakers, a television, a VCR, a digital recorder, a mobile phone, a tape deck, a personal computer, a personal digital assistant, a portable display unit, a car entertainment system, and so on. These devices are usually interconnected to allow one device, e.g. the television, to control another, e.g. the VCR. In some embodiments, one device, such as e.g. the tuner/decoder or a set top box (STB), operates as central device, providing central control over the others.

Content, which typically comprises things like music, songs, movies, animations, speeches, videoclips for music, TV programs, pictures, games, ringtones, spoken books and the like, but which also may include interactive services, is received via different sources, such as a broadband cable network, an Internet connection, a satellite downlink, mobile phone networks, storage media like discs or portable devices. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium S1 such as a suitably large hard disk, allowing the recording and later playback of received content. The storage medium S1 could be a Personal Digital Recorder (PDR) of some kind, for example a DVD+ RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a base station 111, for example using Bluetooth or IEEE 802.11b. The other devices are connected using a conventional wired connection. To allow the devices 101-105 to interact, several interoperability standards are available, which allow different devices to exchange messages and information and to control each other. One well-known standard is the Universal Plug and Play standard (http://www.upnp.org).

Figure 2:
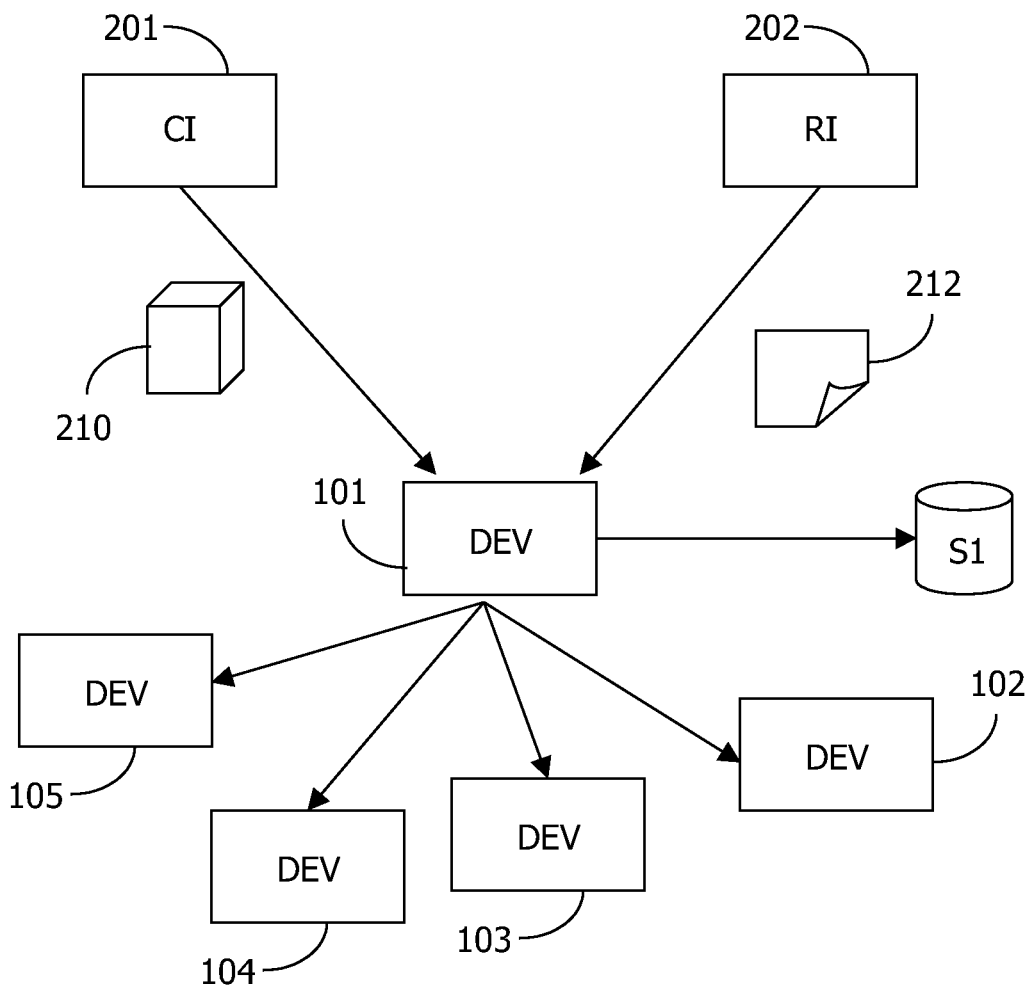
FIG. 2 shows a schematic architectural diagram according to the OMA DRM v2 standard.

The system 100 is set up to manage access to content by operating as an Authorized Domain (AD), preferably in accordance with the OMA DRM v2 standard or a successor thereof FIG. 2 shows a schematic architectural diagram according to the OMA DRM v2 standard.

In FIG. 2, a Content Issuer (CI) 201 makes content 210 available in protected form ("DRM Content" in OMA terminology) to the devices in the AD, here to device 101. To access the content 210, the device 101 needs a Rights Object (RO) 212 which is provided by a Rights Issuer (RI) 202. The provision of the RO 212 may occur simultaneously with the provision of the DRM Content 210, but this is not necessary. For instance, one may obtain content at a certain time and later purchase a RO to access that content. Alternatively one may obtain a RO and only later obtain the content to which the RO applies.

In OMA DRM, a RO is an XML document specifying permissions and constraints associated with a piece of DRM Content. DRM Content cannot be used without an associated RO, and may only be used according to the permissions and constraints specified in a RO. The ROs contain the rights expressions and keys needed for rendering the actual content. The RO acquisition, device registration, and domain management is specified by means of a set of protocols called ROAP.

Each of the devices 101-105 has a DRM Agent, usually embodied as a software component being executed on the device in question. The DRM Agent ensures that the permissions and constraints specified in a RO are adhered to. A Rights Object is cryptographically bound to a specific DRM Agent, so only that DRM Agent can use it.

The DRM Content 210 may be distributed freely between the devices 101-105 and may also be stored, e.g. on storage medium S1, or be distributed to other parties. However, without a valid RO, the DRM Content 210 cannot be accessed. If the device 105 were to acquire a copy of the DRM Content 210 for example, it would still have to obtain a RO that is bound to its DRM Agent. The RO 212 is only usable by the DRM Agent of device 101.

To create domain-based access to content, OMA DRM also permits the creation and distribution of Rights Objects that are bound to a group of DRM Agents, rather than a single agent. Such a group is referred to as a domain, and Rights Objects bound to a domain are referred to as domain Rights Objects. To join the domain, first device 101 must ask Rights Issuer 202 if it is allowed to join a domain. If the device 101 is allowed to join, the RI 202 will provide the device 101 with a Domain Context (DC). The DC contains the domain keys that can be used to decrypt domain Right Objects. See section 6.4 of the OMA DRM v2 specification for details.

The OMA DRM specifications further define the format and the protection mechanism for DRM Content, the format (expression language) and the protection mechanism for the Rights Objects, and the security model for management of encryption keys. The OMA DRM specifications also define how DRM Content and Rights Objects may be transported to devices using a range of transport mechanisms, including pull (HTTP Pull, OMA Download), push (WAP Push, MMS) and streaming. RO transportation usesa 1-pass or 2-pass protocol protocol called Rights Object Acquisition Protocol (ROAP) that is executed between a RI and a DRM User Agent. Alternatively the RO transportation may be performed without executing the ROAP between two DRM User Agents or between a RI and DRM User Agent.

Note that the Content Issuer 201 and the Rights Issuer 202 may be one and the same entity. In OMA terminology this entity is then referred to as a content distributor.

The inventors of the present invention have realized that there is a need for the functional separation of Rights Issuance and Domain Management in the OMA solution. A major drawback of the above-described architecture is that domains cannot be easily shared or used between different RIs.

Figure 3:
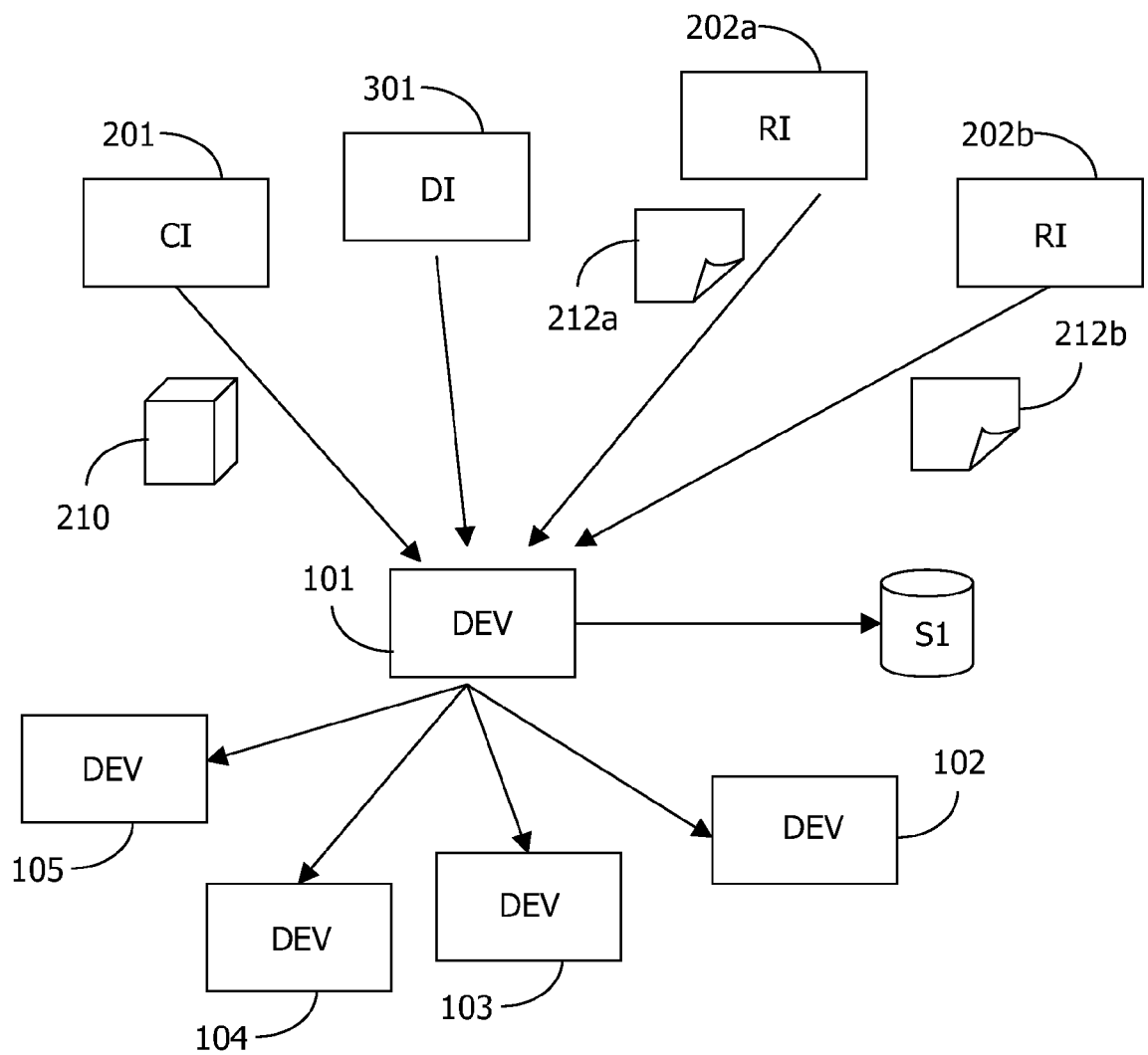
FIG. 3 shows a schematic architectural diagram according to the invention, comprising a separate Domain Issuer and multiple Rights Issuers.

In accordance with the present invention, a separate Domain Issuer (DI) is introduced. Devices that want to join a domain now contact the DI instead of a RI. As a result, multiple RIs can now be used to supply domain ROs to the same domain. This is illustrated schematically in FIG. 3. Two RIs 202a, 202b are provided, both issuing domain ROs 212a, 212b to the device 101. In addition a Domain Issuer (DI) 301 manages which devices join and leave the domain.

The Domain Key, hereafter abbreviated as $K_D$, is now provided by the DI 301 instead of the RI 202 to the devices 101-105. The RIs 202a, 202b no longer have access to the Domain Key. This would mean that they can no longer issue domain Rights Objects to the devices 101-105 since according to OMA DRM v2, domain Rights Objects must be protected using the Domain Key.

According to the invention, each RI is issued its own Diversified Key, hereafter abbreviated as $K_{Di}$ where i is the identifier of the RI to whom the Diversified Key $K_{Di}$ is issued. The Diversified Key is derived from the Domain Key, preferably in conjunction with the identity of the Rights Issuer in question.

In a preferred embodiment, the Diversified Key is created by computing the keyed hash message authentication code (HMAC) of a representation of the identity, preferably a public key, of the Rights Issuer using the Domain Key as the secret key. Preferably the SHA1 cryptographic hash function is used, although many other hash functions could also be used. The computed keyed hash is preferably truncated to retain only the first 128 bits, which 128 bits then serve as the Diversified Key.

Alternatively a cryptographic hash function may be used to compute a hash of the Domain Key, which hash then serves as the Diversified Key. Again the hash may be truncated if necessary. Preferably the input of the cryptographic hash function is not only the Domain Key but also a representation of the identity, preferably a public key, of the Rights Issuer. This preferred embodiment provides different RIs with different keys. For instance, one may hash the concatenation of the Domain Key and the public key.

In another embodiment the key $K_{Di}$ is obtained as an encryption of a representation of the identity of the RI using the domain key DK as encryption key. The representation of the identity of the RI can be created in different ways, depending on what type of names, serial numbers etc. are used within the DRM system implementation. For example, the DM may assign each RI that may communicate with the domain a unique identifying label $Lb_i$ which is exactly 128 bits (16 bytes) in length. This could be a certificate serial number. If the labels are shorter than 16 bytes, then the DM should pre-pad each label with 0 bits, up to 16 bytes, to form the $Lb_i$.

One option to create the Diversified Key now is an AES encryption of this label $Lb_i$ using the Domain Key DK as the encryption key. An advantage of this is that it is very simple, and the resulting keys are guaranteed to be unique.

If each RI has an arbitrarily chosen and unique name, then that name could be padded to create a string of the right length. Standard techniques for padding are available, see e.g. ISO/IEC standard 9797. One preferred option is the following. First pre-pad the name with a block which is 128 bits in length and which is the binary representation of the (unpadded) length of the name in bits. Then post-pad the result with bits of value '0' until the whole message reaches a multiple of 128 bits in length. The result can be encrypted using AES with the Domain Key DK as the encryption key. This has the advantage that arbitrarily chosen names may be used by the RI.

Many alternative options may be thought of. Several examples will now be given. In most circumstances, a keyed MAC function can be applied instead of encryption using the Domain Key DK as key.

To obtain its Diversified Key $K_{Di}$, the Rights Issuer in a preferred embodiment issues a request to the Domain Issuer. If the Rights Issuer is to be permitted to issue ROs to devices in the domain in question, the Domain Issuer issues a response comprising the relevant context. This context comprises the Diversified Key for the Rights Issuer and preferably also identifiers for the Domain Issuer, the domain itself, a validity expiry time (expressed as point in time or duration from a current time) and preferably a RI Validation Token, elaborated below. The expiry time and the Validation Token can take the form of a X.509v3 certificate of a public key for the Rights Issuer that has been generated using a private key for the Domain Issuer.

The Rights Issuer can now generate Rights Objects and use the Diversified Key to encrypt these ROs. This is the same as with standard OMA DRM v2, except that now the Diversified Key is used instead of the Domain Key.

When a device in the domain acquires a domain RO from a Rights Issuer, it constructs a diversified key for this Rights Issuer and uses that diversified key to decrypt the domain RO. To this end the device repeats the process as outlined above for the Domain Issuer.

In an embodiment, the Domain Issuer creates a RI Validation Token which allows the RI to prove that it is allowed to issue domain ROs for the devices in the domain in question. The validation token comprises the identity, e.g. a public key, of the Rights Issuer and preferably also an indication of how long the token will remain valid, e.g. by indicating an expiry date. The validation token should be digitally signed by the DI so that its authenticity can be verified.

In this embodiment the device can use the RI validation token to obtain the identity, i.e. the public key, of the Rights Issuer. Of course the device should not use the RI validation token if the digital signature cannot be successfully verified, or if the token is no longer valid, e.g. if the current time is beyond the indicated expiry date.

According to OMA DRM v2, a Rights Issuer and a device should execute a RI Registration protocol before the device may accept ROs from the Rights Issuer. A benefit of the present invention is that this is no longer a requirement. A device in the domain may also obtain domain ROs from another device in the domain, and in that case does not need to register itself with the RI that originally generated that domain RO.

At certain intervals the domain key may be replaced with a new Domain Key. At this occasion the Domain Issuer should also generate new Diversified Keys for all Rights Issuers that were issued Diversified Keys derived from the previous Domain Key. The Domain Issuer should then preferably provide these new Diversified Keys to these Rights Issuers automatically. Alternatively they can be supplied upon request.

Instead of encrypting the ROs with the Diversified Keys, the Diversified Keys can also be used to create and verify authentication data associated with the Rights Objects. One can e.g. use the Diversified Key as key for a keyed hash function or message authentication code function to be applied to the Rights Object. The output of this function then serves to authenticate the Rights Object.

It is desirable to prevent RIs from generating valid domain ROs for a particular domain without engaging in an RO acquisition protocol (ROAP) with a device that is a member of the domain. To achieve this, in a preferred embodiment devices in the domain, after receiving the RO during the ROAP, compute a Device MAC using the master Domain Key and append the Device MAC to a domain RO when they receive such a domain RO from a RI. The Device MAC thus serves as proof that the domain RO has been acquired from an authorized RI. Note that this approach works also for ROs that have been produced using the Domain Key, rather than a Diversified Key. This approach thus is not restricted to ROs that are encrypted with a Diversified Keys.

The Device MAC can be computed as a MAC of the RO using the Domain Key $K_D$ as the key. This allows any device in the domain to establish the authenticity of the Device MAC. The Device MAC should accompany the RO, preferably by adding it as as a new XML element in the domain RO.

In this embodiment the Device MAC is required for subsequent Device-Device RO exchange and installation at the destination device. Whenever a device receives a domain RO, this device must first validate the Device MAC before accepting and/or installing the domain RO on the device.

Note that once the Domain Key $K_D$ changes, the Device MAC can no longer be validated using the new Domain Key. And a domain RO without a valid accompanying Device MAC should preferably be rejected by devices in the domain. Alternatively, a device that has accepted and installed a domain RO with a valid Device MAC can recompute the Device MAC using the new Domain Key.

The security of the solution proposed above is based on the assumption that the Domain Key $K_D$ is only known by devices that are member of the domain and to the Domain Issuer. However, if the Domain Key $K_D$ somehow becomes available to an unauthorized third party, it becomes possible for a RI to issue domain ROs even after it is authorization to do so has expired.

To solve this problem, a device that generates a Device MAC should generate a digital signature using its private key for this Device MAC. This signature, DeviceSign, will be distributed together with the domain RO and the Device MAC. DeviceSign allows other devices in the domain to identify the device that received the domain RO from the RI.

Should subsequently the Domain Key $K_D$ become compromised and unauthorized ROs be issued, the domain device that accepts these ROs can be identified. This device then likely acts in collusion with the unauthorized RI. The device in question can subsequently be revoked, for example by adding its device identifier to a device revocation list (DRL) that is distributed to all the devices in the domain. Compliant devices only accept and install domain ROs that include the appropriate DeviceSign generated by a device that is not included in the DRL.

To support the above, the Domain Issuer in a preferred embodiment generates a signed object that informs every device in the domain that a particular device, hereafter device$_x$, is allowed to create DeviceSign signatures. The token contains the public key of device$_x$ and is signed by the DI so that it can be validated by any member device of the domain. Preferably the token is made available to devices so that this device can distribute it to other devices.

In this embodiment, whenever a device receives a domain RO, it needs to perform the validation of DeviceSign and the token for device$_x$ in addition to the other steps already discussed.

In this embodiment further every device in the domain has access to a device revocation list, DRL for devices in the domain. This DRL may be stored in the devices or e.g. be accessible via a network. The DRL is preferably realized as a blacklist, by listing the devices whose DeviceSign should not be accepted. Alternatively the DRL can be realized as a whitelist by listing only the devices whose DeviceSign should be accepted.

The invention can also be used to protect and/or authenticate other objects than Rights Objects. For instance, content may be encrypted using the Diversified Keys.

The invention is not just applicable to domains in accordance with OMA DRM. Various proposals exist that implement the concept of authorized domains to some extent. In so-called device based ADs, the domain is formed by a specific set of hardware devices or software applications (referred to collectively as clients hereafter) and content. A domain manager, which can be one or more of the clients, a smart card or another device, controls which clients may join the domain. Only the specific set of clients in the domain (the members) is allowed to make use of the content of that domain, e.g. to open, copy, play or export it. Examples of such device-based ADs are given in international patent application WO 03/098931, international patent application WO 05/088896 and international patent application WO 04/027588 by the same applicant, all of which are hereby incorporated by reference.

One type of device-based AD allows a set of clients bound to a domain to access content bound to that domain. This double binding assures that all the members can access the content. This structure is often established by implementing the bindings through a shared secret key. This key is chosen by a domain manager and distributed to all the members. When content is bound to the domain, the license is cryptographically linked to the domain by means of encryption with the shared key. Alternatively the content may be directly bound to one client, and the clients remain bound to the AD.

Another type of AD is the so-called person-based AD, where the domain is based on persons instead of devices. An example of such a system is described in international patent application WO 04/038568 by the same applicant, incorporated herein by reference, in which content is coupled to persons, which then are grouped into a domain.

A so-called Hybrid Authorized Domain-based DRM system ties content to a group that may contain devices and persons. This group is typically limited to a household, such that:
1. content can be watched on any of the members that belong to the household (e.g. TV in Living, TV in Bedroom, PC)
2. content can be watched by any of the users that belong to the household after they have authenticated themselves on any client (such as a television in a hotel room). Such authentication normally involves a user authentication device such as a smart card.

Examples of hybrid AD systems can be found in international patent application WO 2005/010879 and in international patent application WO 2005/093544, both incorporated herein by reference.

International patent application serial number PCT/IB2005/053531 describes a method of allowing access to an authorized domain, the authorized domain being managed by a domain manager, comprising a step in which a user authentication device, which user authentication device is linked to a foreign device, asserts to the domain manager that a local link between the user authentication device and the foreign device is limited in distance, and a step in which the domain manager allows the foreign device to operate as a member of the authorized domain if the assertion is accepted as accurate.

International patent application serial number PCT/IB2005/053687 describes an authorized domain system comprising a plurality of devices including at least one retrieval device, in which the retrieval device is configured to retrieve revocation status information for two or more devices comprised in the domain and to distribute the retrieved revocation status information to one or more devices with which the retrieval device is in contact.

International patent application WO 2004/077790 describes a telecommunication system for broadcasting multimedia content to a client device. Said system comprises an encoder for encoding said multimedia content in an encoded data stream. Said encoded data stream is transmitted via a first network connection to a server. Said server is able to generate metadata from media data contained in the received encoded data stream and to create a progressive file, in which said media data and metadata are interleaved. Said progressive file is downloaded via a second network connection to a client device, which is able to start playing the received multimedia content before the end of the download, using said interleaved meta and media data.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of authenticating rights to content items in a domain comprising a plurality of devices sharing a domain key, the method comprising acts of:
    at least one Content issuer device providing a content item to the devices in the domain without an associated rights object;
    one or more Rights Issuer devices that are not members of the domain, do not have access to the domain key, and are different from the at least one Content issuer device
    encrypting the associated rights object for each content item using a diversified key derived from the domain key and unique to each Rights Issuer device; and
    supplying the encrypted associated rights object to the devices in the domain,
    wherein the content item is authenticated when its associated rights object a decrypted using the domain key.

2. The method of claim 1, further comprising are act of deriving the diversified key using a keyed cryptographic hash function.

3. The method of claim 2, wherein said keyed cryptographic hash function comprises a representation of an identity of the Rights Issuer device that is not a member of the domain and the domain key.

4. The method of claim 1, further comprising an act of deriving the diversified key by truncating an output of a one-way function to a predetermined number of bits.

5. The method of claim 1, further comprising an act of creating a digitally signed validation token comprising a representation of an identity of the Rights Issuer device that is not a member of the domain.

6. The method of claim 1, further comprising an act of creating a message authentication code for the rights object provided by the Rights Issuer device that is not a member of the domain using the domain key.

7. The method of claim wherein the rights objects comprise digital rights for accessing content.

8. The method of claim 1, further comprising an act of deriving the diversified key using a one-way function from the domain key and from a representation of an identity of the Rights Issuer device that is not a member of the domain.

9. A system for authenticating rights to content items in a domain comprising a plurality of devices sharing a domain key, the system comprising:
    at least one Content issuer device for providing a content item to the devices in the domain without an associated rights object;
    at least one Rights Issuer device that is of a member of the domain, does not have access to the domain key, is different from the at least one Contest issuer device, and is configured to
        encrypt the associated rights object for each content item using a diversified key derived from the domain key and unique to the Rights Issuer device, and
        supply the encrypted associated rights object to the devices in the domain,
    wherein the content item is authenticated when its associated rights object is decrypted using the domain key.

10. The system of claim 9, wherein each device is configured for computing a message authentication code for the rights object using the domain key, and distributing the rights object to another device in the domain in conjunction with the computed message authentication code.

11. The system of claim 10, wherein each device is further configured for receiving a new domain key, computing a new message authentication code for the rights object using the new domain key, and distributing the rights object to another device in the domain in conjunction with the computed message authentic code.

12. A method of authenticating rights to content items in a domain comprising a plurality of devices sharing a domain key, the method comprising acts of:
    one or more Rights Issuer devices that are not members of the domain and do not have access to the domain key
        encoding a rights object for each content item using a diversified key derived from the domain key, the content item is authenticated when its respective rights object is decrypted using the domain key, and
        supplying the rights object to the domain;
    deriving the diversified key using a one-way function from the domain key and from a representation of en identity of the Rights issuer device that is not a member of the domain; and
    at least one of the plurality of devices
        authenticating the content items corresponding to said rights object using the domain key.

* * * * *